Figure 1:
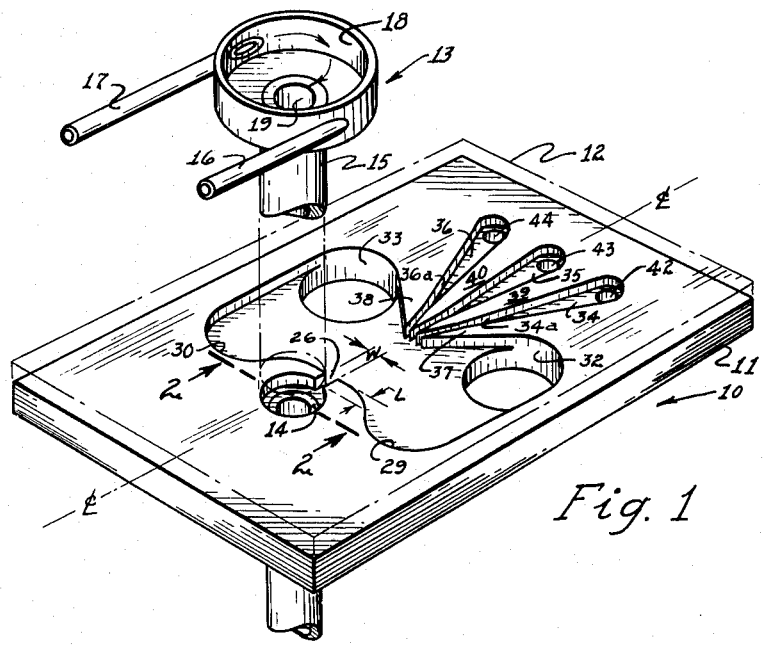

June 21, 1966  E. M. DEXTER ETAL  3,256,899
ROTATIONAL-TO-LINEAR FLOW CONVERTER
Filed Nov. 26, 1962

INVENTOR
Edwin M. Dexter
D. Roland Jones

BY Hurvitz & Rose

ATTORNEYS

United States Patent Office 3,256,899
Patented June 21, 1966

3,256,899
ROTATIONAL-TO-LINEAR FLOW CONVERTER
Edwin M. Dexter, Silver Spring, and Donnie Roland Jones, Hyattsville, Md., assignors to Bowles Engineering Corporation, Silver Spring, Md., a corporation of Maryland
Filed Nov. 26, 1962, Ser. No. 240,060
10 Claims. (Cl. 137—81.5)

The present invention relates generally to fluid devices requiring no moving mechanical parts for the operation thereof, and more specifically, relates to a fluid vortex amplifying device for amplifying the circumferential velocity component of rotating fluid input signals and for converting such signals to linear control output signals, the direction and magnitude of the output signals being a function of the direction and angular velocity of the input signals.

The rotating flow of fluid to be applied to the apparatus of the present invention may be derived from a source capable of imparting rotation to a fluid column and the circumferential velocity component of the rotating fluid is velocity amplified by a vortex amplifier. A preferred type of fluid vortex amplifier utilizes a flow of fluid, fluid characteristics, and fluid flow characteristics to amplify a fluid input signal and requires no moving parts other than the moving fluid itself.

In order to fully understand the operation of the fluid vortex amplifier employed in the present invention, it is necessary to understand the basic operation of one type of conventional fluid vortex amplifier that employs the flow of fluid, fluid characteristics, and fluid flow characteristics to amplify a fluid input signal and does not require moving parts other than the moving fluid itself.

Assume that a circular pan of liquid is provided with a small discharge orifice at the bottom center. The height of liquid in the pan results in a hydrostatic head or pressure which tends to force the fluid out of the small centrally located discharge orifice. In the case of irrotational flow, the fluid flows radially toward and through the orifice. For an incompressible fluid the flow velocity will be inversely related to the liquid radial location. If one considers a two-dimensional irrotational flow condition, as for example, in the case of flow to a conventional sink, the radial velocity $V_r$ and the radial position $r$ are related as in Equation 1

$$V_r = \frac{\text{constant}}{r} \quad (1)$$

If the fluid is compressible then the local fluid density $\rho$ must be considered and Equation 1 becomes $$V_r = \frac{\text{constant}}{r\rho} \quad (2)$$

If a tangential component of velocity is imparted to the fluid immediately adjacent to the pan rim, a fluid annulus rotates as a whole about the discharge hole as an axis, and the flow is now rotational rather than irrotational. It has been shown mathematically in text books on the subject, that as this annulus shrinks toward the centrally located outlet, the circumferential velocity component $V_c$ for simple rotational flow is related to the radial position by Equation 3

$$V_c = \frac{\text{constant}}{r} \quad (3)$$

Consequently, when the fluid is discharging from the pan, as fluid moves from the rim toward the centrally located discharge orifice, its circumferential velocity component $V_c$ increases as the radial position decreases. Ideally, if one starts with a 10 inch diameter pan discharging through a centrally located orifice of .01 inch diameter the circumferential velocity component at the discharge orifice $V_{cd}$ would be one thousand times the circumferential velocity component at the rim of the pan $V_{cc}$. Thus, the circumferential velocity component is amplified.

While an open pan of liquid has been used to describe in elementary fashion the operation of a vortex amplifier, this invention employs an enclosed vortex chamber, wherein the fluid need not be liquid but can be a liquid or a gas or a mixture of fluid or combinations of fluids and wherein the source of pressure causing fluid discharge is not derived from gravitational effects but is due to a flow or flows of fluid streams into the vortex chamber at a radius different from the discharge radius from a discharge orifice.

Rotating fluid flow issuing from the discharge orifice when transferred to a tube or pipe takes the form of a rotating column of fluid, the rotation thereof being directionally dependent upon the direction of vortical rotation within the vortex amplifier. The angular velocity of the fluid column in the tube is a function of the angular velocity of the fluid egressing from the orifice.

Certain applications of the vortex amplifier make it desirable, or necessary in some instances to provide units with no moving mechanical parts for amplifying and converting the vortical flow which may be derived from a vortex amplifier to linear fluid flows, having direction, velocity and mass flow which are a function of the angular velocity and direction of rotation of the fluid supplied to the unit from the vortex amplifier. It is to be understood that although the present invention is hereinafter described as being employed in conjunction with a vortex amplifier, the apparatus may be used to sense the direction and velocity of rotation of fluids regardless of the mechanism utilized to create the rotation of the fluid.

The linear fluid output flow provided by the apparatus of the invention may be advantageously employed to control the power stream of a conventional beam deflection type fluid amplifier, such as disclosed in U.S. Patent No. 3,039,490, to energize or actuate electrical or fluid read-out devices which respond to variable fluid flows or pressures to indicate the direction of rotation and the magnitude of the amplified circumferential velocity component of vortical flow.

The apparatus provided by the present invention, since it does not employ moving parts other than the operating fluid, does not suffer from the disadvantages normally associated with moving mechanical elements. In general, frictional forces developed by interacting mechanical parts create heat and wear in a device incorporating such parts and in addition, the inertia of the moving parts in conjunction with the associated frictional forces increase the overall response time of the device. In fluid devices required to respond to recurring changes of a condition, for instance, a change of fluid flow direction or velocity, a short time constant is an important advantageous characteristic. It is, therefore, of primary importance to reduce or eliminate, if possible, all moving mechanical parts from the device. The fluid rotational flow converter of this invention employs only rotating fluid input signals; all mechanical elements or components forming the unit remaining stationary during operation thereof, so that the converter may have a minimum response time to a change of signal input direction and velocity.

Broadly, therefore, it is an object of this invention to provide a fluid unit having no moving mechanical parts for converting rotating fluid input signals to velocity amplified vortical flow and thereafter to plural linear flow output signals, the magnitude of each output signal being a function of the direction of rotation of the input signal.

More specifically, it is an object of this invention to provide a unit for converting bi-direction rotational fluid input signals into velocity amplified vortical flow and for converting the vortical flow into linear fluid output signals, the relative magnitudes of the output signals issuing from the unit being a function of the amplification and direction of the input signals.

Another object of this invention is to provide a unit, in accordance with either of the foregoing objects, that may be readily coupled to other types of fluid units.

Figure 3:
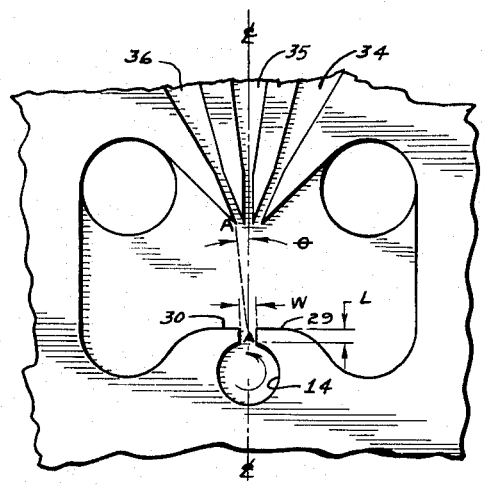
Figure 2:
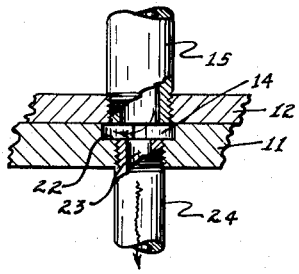

The above and still further objects, features and advantages of the present invention will become apparent upon consideration of the following detailed description of one specific embodiment thereof, especially when taken in conjunction with the accompanying drawings, wherein:

FIGURE 1 is a perspective view of the rotational fluid converter constructed in accordance with this invention, FIGURE 2 is a partial side sectional view taken through section lines 2—2 of FIGURE 1 and FIGURE 3 is a partial plan view of the rotational fluid converter constructed in accordance with this invention.

Referring to FIGURE 1 of the accompanying drawing for a more complete understanding of this invention, a unit 10 is formed in a flat plate 11 by molding, milling, casting, etching or other techniques capable of providing the necessary passages and cavities of the unit. A second plate 12 is designed to cover the plate 11, both plates preferably being sealed fluid-tight one to the other by machine screws, clamps or adhesives, or by any other suitable means. The plates 11 and 12 may be composed of metal, plastic or any other material compatible with the fluid employed, and for purpose of clarity, the plates are shown as composed of a transparent material such as glass.

A vortex type of fluid amplifier designated generally by numeral 13 is shown coupled to a substantially cylindrical chamber 14 formed in the plate 11 by a tube 15 so that rotational flow output signals from the amplifier 13 are received by the chamber 14. The vortex amplifier 13 may, for example, be of the type disclosed in detail in a co-pending patent application entitled "Differential Fluid Amplifier," Serial No. 226,856, filed September 28, 1962, by Francis M. Manion, assigned to the same assignee as the present invention.

Assuming, for the purpose of illustrating the operation of the unit 10, that the amplifier 13 is of this type, a pair of tubes 16 and 17 receive fluid input signals from a suitable source and supply the fluid received to a vortex chamber 18 formed in the vortex amplifier 13 substantially eccentrically thereof so as to create vortical flow in the vortex chamber 18, the flow issuing from a centrally disposed orifice 19. As discussed in detail in the aforementioned co-pending patent application Serial No. 226,856, the pressure differentials between the input signals supplied to the input tubes 16 and 17 will create a vortex in the vortex chamber 18 by interaction of the streams, the resulting vortex having a direction of rotation and an angular velocity that is a function of the differential in pressure between the two streams supplied to the vortex chamber 18. Other types of vortex amplifiers may alternately be used to supply the rotating control fluid to the vortex chamber 14, as, for example, the vortex amplifier disclosed in a co-pending patent application Serial No. 49,061, filed August 11, 1960, by Romald E. Bowles. It should be understood that the output of sources other than vortex amplifiers may be connected to the vortex chamber 14 to supply rotating fluid to the chamber 14, the types of vortex amplifiers referred to hereinabove representing only possible sources of rotating fluid input signals which can be converted to linear signals by the unit 10.

A column of rotating fluid egressing from the orifice 19 travels axially through the tube 15. The tube 15 may be threadedly connected to the top plate 12 through an orifice 20, FIGURE 2, the end of the tube 15 terminating flush with the lower surface of the plate 12, as shown. The tube 15 may alternatively be fixed to the plate 12 by adhesives, welding or other techniques compatible with the materials employed to terminate flush with the upper surface of the plate 12 so that the rotating column of fluid passes through the orifice 20 into the chamber 14.

The circumferential velocity component of the rotating fluid egressing from the tube 15, or the orifice 20, as the case may be, causes divergence of the fluid when it is no longer confined by the tube 15 or the orifice 20. The fluid egressing from the tube 15 impinges against a bottom wall 22 of the vortex chamber 14 with the axis of rotation thereof substantially perpendicular to the plane of the wall 22 and creates vortical flow within the chamber 14, the flow therein having the same sense of rotation as the fluid issuing from the vortex amplifier 13.

An orifice 23 (FIGURE 2) extends from the bottom wall 22 through the plate 11 in substantial vertical alignment with the orifice 20 and the tube 15 so that at least a portion of the axial component of flow in the chamber 14 can egress through the orifice 23. The provision of a centrally located orifice, such as the orifice 23, having a radius less than the radius of the chamber 14 is essential since the orifice 23 converts the chamber 14 into a vortex amplifying chamber.

The diameter of the orifice 23 should not be greater than the diameter of the vortex flowing against the bottom wall 22, otherwise the circumferential velocity component of vortical flow egresses from the chamber 14 with the axial component of flow. The orifice 23 is also employed to permit egress of excessive fluid input flow through a tube 24 which would flood the chamber 14 or impede the generation of the desired rotational flow pattern therein.

Ordinarily, the degree of amplification desired as well as the rate of flow of fluid supplied to the chamber 14 will be known, and the desired gain can be provided by suitably proportioning the radius of the chamber 14 relative to the radius of orifice 23. The degree of amplification that can be attained by the vortex chamber 14 increases as the ratio between the radius of the chamber 14 and the radius of the orifice 23 increases. For a constant chamber radius, increasing the radius of the orifice 23 decreases the amplification factor and vice versa.

The chamber 14 is formed with an orifice 26, the parallel sidewalls of the orifice 26 being in substantial alignment with the center of the chamber 14, the length of the sidewalls being designated by the letter L and the width between the sidewalls being designated by the letter W. A chamber 28 comprising a pair of symmetrical sidewalls 29 and 30 is formed in the plate 11 to receive flow from the orifice 26, the pattern of flow in the chamber 28 being primarily determined by the direction of vortical flow in the chamber 14, as will be discussed in detail hereinafter. A pair of orifices 32 and 33 extend through the plate 11 and serve to maintain the pressure in the chamber 28 at essentially ambient pressure. The walls 29 and 30 are preferably set back remote from the orifice 26 so that fluid streams which may issue from the orifice 26 do not attach themselves to either wall 29 or 30.

Located downstream of the orifice 26 and communicating with the opposite end of the chamber 28 are three output passages 34, 35 and 36, respectively. The entrance to the passage 35 is defined by the apices of flow splitters 39 and 40, and the entrances to the passages 34 and 36 are defined by these apices and the apices of a pair of cusps 37 and 38. The cusps 37 and 38 are formed by substantially circular shaped sections of the sidewalls 29 and 30, respectively, and by a relatively short section of the sidewalls 34a and 36a adjacent the entrance to the passages 34, 36, respectively. The apices of the cusps 37 and 38 intercept any extreme fringe portions of either side of the main fluid stream entering the output passages 34, 35 and 36, and the circular sections of the sidewalls 28 and 29 direct such fringe portions into the openings 32 and 33.

Openings 42, 43 and 44 extend through the plate 11 for receiving the fluid output flow from the passages 34, 35 and 36, respectively. Generally, only fluid issuing from the openings 42 and 44 is used to control or drive other fluid amplifiers or load devices to which the openings 42 and 44 are connected, and the opening 43 therefore usually receives and dumps fluid entering the passage 35 into a sump or into some suitable receptacle (not shown).

Considering now the operation of the unit 10, and asuming that fluid flow in the vortex amplifier 13 is in a colckwise direction as viewed in FIGURE 1 of the accompanying drawing, the chamber 14 receives the clockwise rotating flow and the circumferential component of vortical flow in the chamber 14 is velocity amplified and issues from the orifice 26 as a somewhat diffused fluid stream. When the vortical flow in the chamber 14 is rotating in a clockwise sense, the diffused flow pattern in the chamber 28 between the orifice 26 and the entrances to the passages 34, 35 and 36 will be asymmetrical with respect to a centerline C—C of the unit because the clockwise rotating tangential velocity component of the vortical fluid in the chamber 14 tends to deflect a greater portion or quantity of the flow from the orifice 26 toward the entrance to the passage 34 than toward the entrance of the passage 36. Consequently, a larger quantity or proportion of essentially linear flow enters the passage 34, a smaller proportion enters the passage 35 and a still smaller proportion enters the passage 36. Conversely, when the rotational flow input supplied to the chamber 14 rotates in counterclockwise sense of rotation, the counterclockwise rotating circumferential velocity component of the vortex which issues at an angle to the parallel sidewalls of the orifice 26 directs the greatest quantity or proportion of flow and into the passage 36 and the passage 34 receives the least amount of flow.

The length L of the parallel sidewalls of the orifice 26 is critical since if the length L of the orifice is too long with respect to the width W, the fluid stream issuing from the orifice 26 will not adequately diffuse or "fan out" and consequently, the fluid flow pattern in the chamber 28 will be essentially in the form of a confined stream of fluid of substantially rectangular shape. The entrance to the passage 35 is positioned in substantial alignment with the orifice 26 and therefore all, or substantially all, of the fluid column will be directed into the passage 35, passages 34 and 36 receiving little, if any, flow under this condition. Another extreme condition may occur if the length L of the orifice 26 is too short relative to the width W, so that the fluid stream issuing from the orifice 26 sprays into the chamber 28 with considerable diffusion thereby taking flow paths which diverge at substantial angles from the direction of the confined flow through the orifice 26. Since the flow is not confined to a relatively constricted stream flow, it tends to flow toward the confining sidewalls 29 and 30 upon issuing from the orifice 26. Despite the fact that the sidewalls 29 and 30 are set back at a considerable angle from the sides of the orifice 26, lock on effects may develop, the flow locking on to the sidewall 29 or 30 toward which it is inclined by the momentum imparted to the flow by the rotating fluid in the chamber 14. Under these conditions, the diffused flow will tend to lock on to the sidewall 29, for instance, when the rotational direction is clockwise in the chamber 14 as viewed in FIGURE 1, and onto the sidewall 30 when the flow in that chamber is counterclockwise. When the flow locks on to either the sidewall 29 or 30, it flows into the orifices 32 or 33, respectively, and no fluid enters the passages 34, 35 and 36.

Therefore, a proper relationship between the length L and the width W of the orifice 26 must be established to effect a diffusion or fanning out of the stream in the chamber 28 whereby the flow is not so constricted that it issues into only one passage and not so diffused that lock on occurs between the flow and one of chamber sidewalls. Preferably the flow pattern should be sufficiently diffused so that each of the passages 34, 35 and 36 can receive at least some quantity of fluid regardless of the direction of rotation of the flow in the chamber 14.

In the particular embodiment illustrated in the figures, the length L of the orifice 26 should preferably be greater than $\frac{1}{8}$ W and less than W. It will be apparent that the distance between the orifice 26 and the entrance to the passages 34, 35 and 36 should be great enough so that a proper pattern of diffusion develops between the orifice 26 and the entrances to the passages 34, 35 and 36 so that each passage receives at least some quantity of fluid. Fluid at the fringes of the main fluid stream is scooped by the cusps 37 or 38 into the chamber 28 and directed into either the orifice 32 or 33, respectively, from whence it egresses from the unit 10.

To recapitulate, the velocity and proportion of essentially linear flow received by each of the passages 34, 35 and 36, for given dimensions of the orifice 26, is a function of the circumferential velocity component of vortical flow in the chamber 14 and the direction of rotation of the vortical flow in the chamber 14. In the event nonrotating fluid signals are received by the chamber 14, vortical flow will not be created in the chamber 14 and the fluid will egress from the orifice 23. The orifice 23 formed in the chamber 14 is essential because it converts the chamber 14 to a vortex amplifying chamber. A vortex amplifying chamber is capable of converting the static pressure in the chamber to directed dynamic pressure and consequently a greater proportion of the total energy of the rotating fluid supplied to the chamber 14 will be converted to a circumferentially directed form. Consequently, the output from the orifice 26 will have a higher energy content than would be the case if a vortex amplifying chamber were not provided in the unit 10.

Suitable fluid pressure or flow responsive devices (not shown) or electrical readout devices (not shown) that can be actuated by variations in fluid flow or pressure may be connected across any two of the openings 42, 43 or 44 to give an indication of the magnitude of the velocity and/or direction of flow issuing from a conventional vortex amplifier. Since the greatest differentials in fluid flow and pressure exist between the passages 34 and 36, such devices will usually be connected to receive the output from the openings 42 and 44, respectively. The linear flow output from the openings 42 and 44 may also be supplied as control fluid to the control nozzles of a beam deflection type of fluid amplifier so that a relatively small energy vortical flow from a vortex amplifier ultimately controls the displacement of a relatively large energized power stream issuing into the interaction chamber of the beam deflection type amplifier. Three stage amplification may be attained by coupling the unit 10 between these two types of amplifiers. It will be apparent to those working in the art that the number of linear flow receiving passages incorporated in the unit 10 is a matter of choice, and, if desired, only one output passage may be used. Because of the diffused character of the fluid stream, greater differentials in output signals, within limits, will be developed between the end passages when there are more than two output passages embodied in the unit.

What we claim is:

1. A fluid vortex system comprising at least a partial, substantially cylindrical chamber having at least one end wall and a generally cylindrical sidewall, said chamber receiving and confining rotating fluid therein, said chamber having an orifice formed in said end wall centrally therein, the diameter of said chamber being considerably greater than the diameter of said orifice, an opening formed in said sidewall, plural passages communicating with said opening formed in said sidewall of said chamber for receiving fluid therefrom, said passages having the entrance to each spaced from said opening so that fluid issuing from said opening diffuses before entering said passages, the pattern of flow diffusion being a function of the direction and rate of rotation of the fluid in said chamber, said passages receiving differentially varying proportions of fluid as determined by the pattern of fluid diffusion, and means communicating with said chamber for supplying rotating fluid thereto, said means positioned so that the axis of the rotating fluid is substantial alignment with the geometrical center of said orifice.

2. In a fluid system, at least a partial, substantially cylindrical chamber having at least one end wall and a generally cylindrical sidewall, said chamber receiving and confining rotating fluid therein, a narrow opening formed in said sidewall, plural passages communicating with said opening formed in said sidewall of said chamber for receiving fluid therefrom, said passages having the entrances thereto spaced from said opening so that fluid issuing from said chamber diffuses before entering said passages, the pattern of diffusion being a function of the direction and tangential velocity of flow in said chamber, said passages receiving differentially varying proportions of fluid as determined by the pattern of flow diffusion, said chamber being provided with an egress orifice formed in said end wall in substantial alignment with the axis of rotation of the rotating fluid therein, said egress orifice having a smaller diameter than the diameter of said cylindrical chamber.

3. In a fluid vortex system, a substantially cylindrical chamber having at least one end wall and a generally cylindrical sidewall, said chamber receiving rotating fluid and having an axis of symmetry, said chamber having an orifice formed in said end wall on said axis, the radius of said chamber being considerably greater than the radius of said orifice so that the tangential velocity component of flow is amplified in said chamber, a narrow opening formed in said sidewall, plural passages communicating with said opening formed in said sidewall of said chamber for receiving fluid therefrom, said passages having the entrances thereto spaced from said opening so that fluid issuing from said chamber diffuses before entering said passages, the pattern of diffusion being a function of the direction and tangential velocity of vortical flow in said chamber, said passages receiving differentially varying proportions of fluid as determined by the pattern of flow diffusion, and means communicating with said chamber for supplying rotating fluid thereto with the axis of the rotating fluid in substantial alignment with the axis of said chamber.

4. A pure fluid device, comprising means for imparting rotation to a column of fluid, a vortex amplifier chamber having at least a bottom wall and a substantially cylindrical sidewall for receiving and confining the column of fluid from said means, said chamber having an axis of symmetry and an orifice centrally located on said axis of symmetry, the diameter of said chamber being considerably greater than the diameter of said orifice so that the rotational velocity component of the rotating fluid is amplified in said chamber, said chamber including a port extending laterally through the sidewall thereof through which the tangential velocity component of flow in said chamber is directed, a second chamber for receiving the fluid from said port, plural passages having the entrances thereof located downstream of said second chamber for receiving fluid therefrom, said second chamber permitting the diffusion of fluid issuing from said port so that certain of said passages receive varying proportions of fluid as determined by the pattern of flow diffusion in said second chamber.

5. A fluid system comprising a first chamber for receiving and confining fluid flow supplied thereto, plural passages located downstream of said first chamber for receiving fluid flow therefrom, a vortex amplifier including a partial cylindrical sidewall and an orifice located at the axis of symmetry of said sidewall through which a portion of the rotating flow can egress from said amplifier as to amplify the tangential velocity component of the rotating flow, said vortex amplifier having a port formed in said sidewall extending perpendicular to the axis of symmetry and in communication with first chamber so that the tangential velocity component of the flow in said amplifier issues from said first chamber as a velocity amplified and substantially diffused linear fluid stream, means communicating with said vortex amplifier for supplying rotating flow thereto having the axis of rotation thereof substantially coincident with the axis of symmetry of said vortex amplifier, each of said passages receiving a variable proportion of the fluid stream flowing in said first chamber as determined by the direction of vortex rotation in said vortex chamber.

6. A fluid system comprising a first region, a vortex amplifier including a generally cylindrical sidewall and at least one end wall having a centrally located egress orifice, a port formed in said sidewall adjacent one end of said region so as to issue a fluid stream into said region, a plurality of passages located downstream from said port, said passages having ingress orifices generally directed toward said port so as to receive fluid issued by said port across said region and means for introducing fluid into said amplifier having a rotational flow component.

7. A fluid system having a first vortex amplifier having a centrally located egress orifice, a second vortex amplifier having a centrally located egress orifice and a generally cylindrical sidewall, means for introducing into said second vortex amplifier fluid flowing through said egress orifice of said first vortex amplifier, a port formed in said sidewall of said second vortex amplifier and means for determining the direction of fluid flow from said port relative to a radius of said cylindrical wall passing through said port.

8. A fluid vortex system comprising a power nozzle for issuing a stream of fluid, a plurality of passages located downstream from said nozzle for receiving fluid therefrom in proportions which vary with the direction of fluid flow from said nozzle, said nozzle including a cylindrical chamber having a generally circular sidewall having a narrow radial opening therein, said plurality of passages being symmetrically located relative to said radius and means for introducing rotating fluid into said chamber so that fluid issuing from said radial opening has a direction depending upon the direction and rate of rotation of said rotating fluid.

9. The combination according to claim 8 wherein means is provided between said opening and said plurality of passages for preventing boundary layer effects from affecting the direction of said stream relative to said radius.

10. The combination according to claim 8 wherein said chamber further includes an egress orifice coaxial with and of substantially smaller diameter than said chamber.

References Cited by the Examiner

UNITED STATES PATENTS

| 1,381,095 | 6/1921 | Starr | 239—468 XR |
| 2,139,736 | 12/1938 | Durham | 181—58 |
| 2,484,577 | 10/1949 | Murphy | 239—468 |
| 2,916,873 | 12/1959 | Walker | 239—290 XR |
| 3,075,227 | 1/1963 | Bowles | 15—346 |

FOREIGN PATENTS

| 194,571 | 1/1958 | Austria. |

LAVERNE D. GEIGER, *Primary Examiner.*